United States Patent [19]
Tausheck

[11] 3,881,618
[45] May 6, 1975

[54] PORTABLE, ONE MAN OPERATED, LARGE SHEET GLASS CUTTING TABLE

[75] Inventor: Russell W. Tausheck, Hayward, Calif.

[73] Assignee: Ace Glass Co., Hayward, Calif.

[22] Filed: Nov. 15, 1972

[21] Appl. No.: 306,720

[52] U.S. Cl. .................. 214/505; 83/6; 214/1 S; 214/84; 214/85.5
[51] Int. Cl. ............................................. B26d 3/08
[58] Field of Search ......... 214/1 S, 1 SW, 1 H, 1 Q, 214/1 R, 501, 506, 505, 784, 85.5; 83/10, 417; 225/96.5

[56] References Cited
UNITED STATES PATENTS

| | | | |
|---|---|---|---|
| 3,417,877 | 12/1968 | Corley | 214/1 SW |
| 3,422,732 | 1/1969 | York | 193/37 X |
| 3,668,955 | 6/1972 | Rupprecht | 83/417 X |

FOREIGN PATENTS OR APPLICATIONS

| | | | |
|---|---|---|---|
| 213,792 | 11/1956 | Australia | 214/505 |

*Primary Examiner*—Frank E. Werner
*Attorney, Agent, or Firm*—William R. Piper

[57] ABSTRACT

A portable, one man operated large sheet glass handling and cutting table which includes a portable frame and a tiltable table top that can be swung from a horizontal position into an upright position where the plane of the table top is inclined at an angle of about 5° from a vertical plane. Novel means is provided for removing a large sheet of glass or other material edgewise from a casing and pulling this sheet onto the table top while it is in an upwardly and slightly inclined position, the table top being provided with a plurality of rubber rollers disposed adjacent to the lower edge of the table top for supporting the lower edge of the glass sheet. These rubber rollers can individually be moved from operative to inoperative position and vice versa. A plurality of spherical balls are removably mounted in spaced arrangement over the table top for supporting the large glass sheet above the table top. The table top can handle flat sheet material other than glass if desired.

5 Claims, 16 Drawing Figures

PORTABLE, ONE MAN OPERATED, LARGE SHEET GLASS CUTTING TABLE

CROSS-REFERENCE TO RELATED APPLICATION

In a copending application on a Tiltable Glass Cutting Table, Ser. No. 306,719, filed Nov. 15, 1972, I disclose a table top that has openings through which a plurality of vacuum cups may be moved for engagement with the face of a large glass sheet for transferring the glass from a casing onto the table top while the latter is in an upwardly inclined position. The table can then be swung into a horizontal position for the purpose of cutting the sheet glass in any manner desired.

BACKGROUND OF THE INVENTION

Field of the Invention

The manufacturers of plate or float glass at the present time are making and shipping larger sheets than heretofore that normally require several men to handle when removing a glass sheet from the casing and transferring it to a glass cutting table. My device has been designed so that one man alone can use it for removing a large sheet of glass endwise from a casing and moving the glass onto the device for moving it to any desired location and for cutting the glass into smaller pieces of any desired shape. The operator need never touch the glass and is not near the glass as it is being pulled onto the table.

SUMMARY OF THE INVENTION

An object of my invention is to provide a portable, one man operated, large sheet glass cutting table which is designed to permit an operator to handle large flat sheets of glass with safety to himself. Another object of my invention is to move the table to the cased glass, rather than move the large sheets to a nonportable table, which has been the method used in the past. Novel means is provided for raising the table top into an upwardly inclined position and then the device can be moved adjacent to the open end of a casing of glass so that the plane of the table top will substantially parallel the plane of the glass sheet in the casing. An electric winch is mounted at the side of the table top farthest removed from the open end of the casing and the operator can move the winch into operative position and then unwind a cable from the winch that has a vacuum cup attached to the free end of the cable, the operator attaching the vacuum cup to the exposed end of the large glass sheet that is to be pulled from the casing. The operator can now stand in a safe position near the pulling winch while operating the winch for causing the cable and vacuum cup to pull the glass from the casing and onto the upwardly inclined table top, the lower edge of the glass riding on rubber rollers that are mounted near the lower edge of the tilted table top and have been moved into operative position.

DESCRIPTION OF PREFERRED EMBODIMENT

Figure 7:
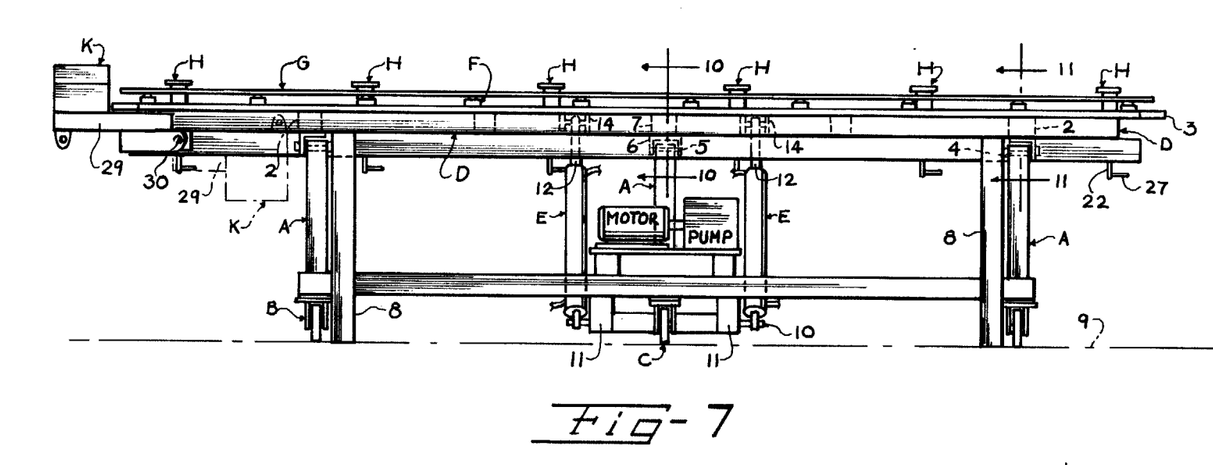
FIG. 7 is a rear elevation of the portable frame and shows the tiltable table top in a horizontal position and supporting a sheet of glass. The electric winch has not been swung into its inoperative position.
Figure 8:
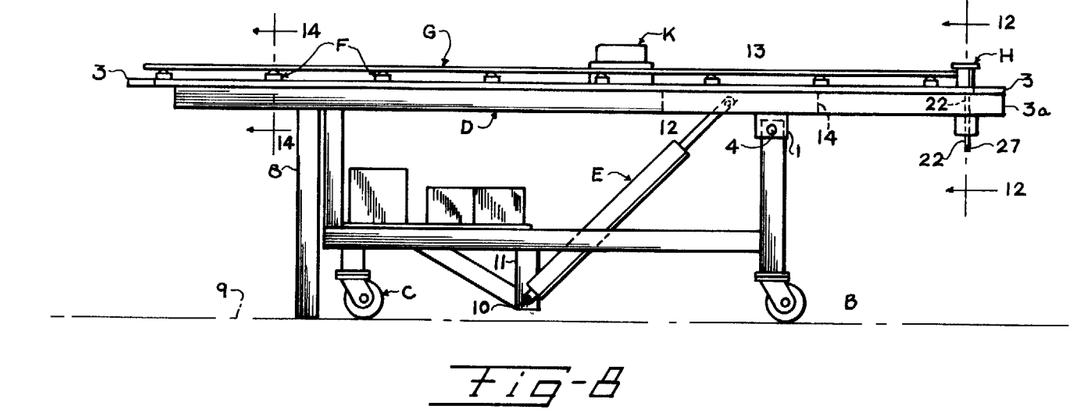
FIG. 8 is a side elevation of FIG. 7 when looking from the right hand side of that Figure.
Figures 9, 10, 11:
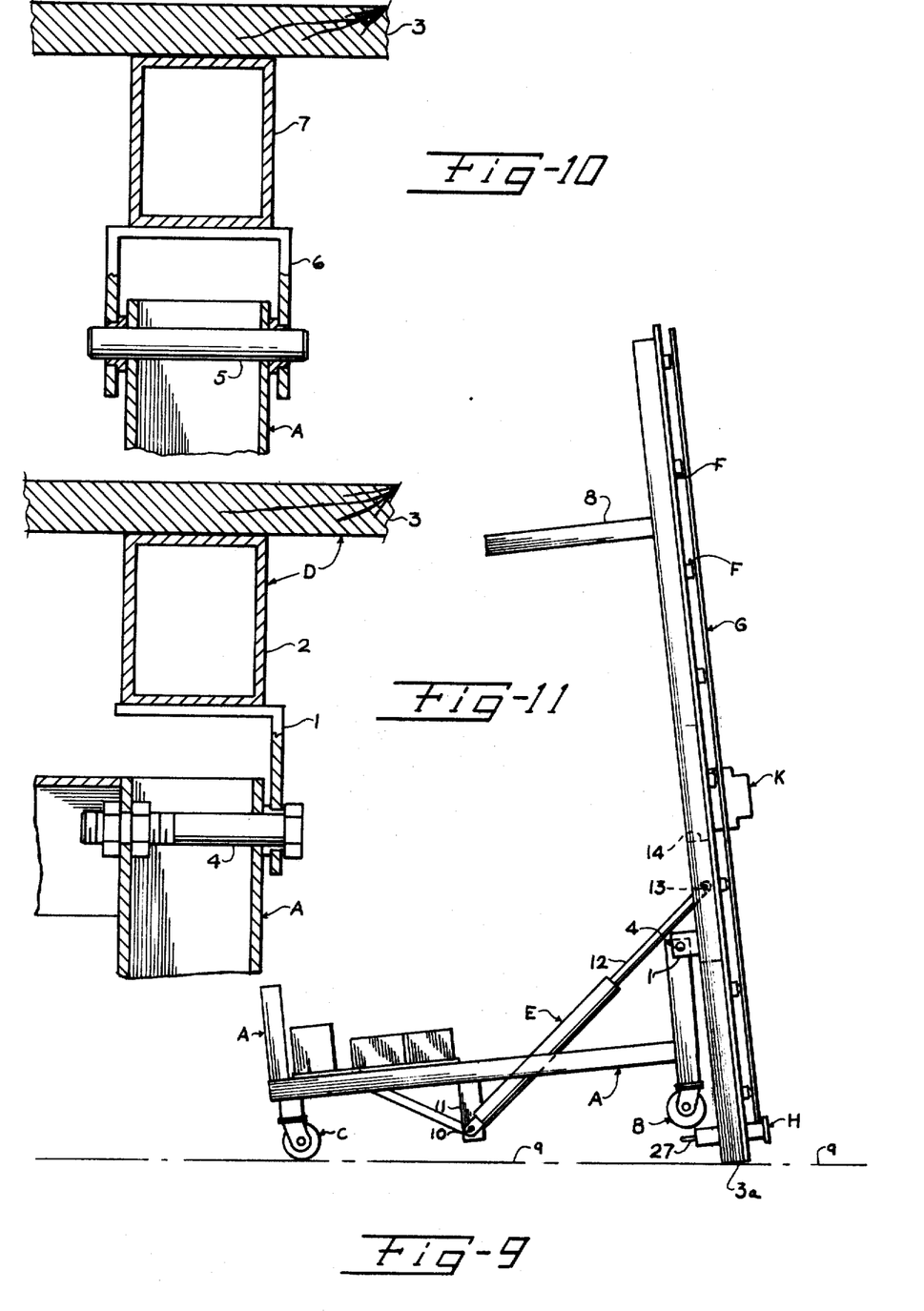
FIG. 9 is a side elevation of the device similar to FIG. 8, but showing the tiltable table top in raised position and the lower edge of the top resting on the floor and raising the front portion of the portable frame above the floor so as to prevent any accidental movement of the device over the floor when pulling a sheet of glass from the casing onto the table top. In order to again move the table it is necessary to lower the table top so that the caster wheels can again touch the floor.
FIG. 10 is an enlarged transverse section through the central pivotal connection between the tiltable table top and its supporting frame and it is taken along the line 10—10 of FIG. 7.
FIG. 11 is an enlarged transverse section through one of the two side pivotal connections between the tiltable table top and its supporting frame and it is taken along the line 11—11 of FIG. 7.

In carrying out my invention I provide a portable tricycle type frame indicated generally at A in FIGS. 7 and 8. The frame has two front caster wheels B—B, one being disposed at each side of the frame. A rear caster wheel C is also provided for the frame A. A tiltable table top D has a pair of spaced apart angle irons 1—1 secured to its underside, one being disposed at each side of the frame, see also the enlarged sectional detail of FIG. 11. A box beam 2 is supported by each angle iron 1 and the box beam in turn forms a part of a frame that supports the table top platform 3 which is preferably rectangular in shape. FIG. 11 illustrates a large bolt 4 pivotally connecting the angle iron 1 to the frame A, see also FIG. 8.

The table top supporting frame also has a central pivotal connecting pin 5, see FIG. 10, whose axis is in alignment with the axes of the two hinge bolts 4, and the pin connects a channel 6 to the frame A, the channel in turn being connected to a box beam 7 that forms a part of the frame that has the table top platform 3 attached thereto. The rear portion of the table top D is provided with one or more depending legs 8 that contact the floor 9 when the table top is in a horizontal position. These legs when contacting the floor not only support the rear portion of the table top when it is in a horizontal position, but the legs also tend to prevent the accidental moveing of the portable frame A over the floor.

I will now described the hydraulic mechanism for swinging the table top D from the horizontal position, shown in FIG. 8, into the upwardly inclined position, as shown in FIG. 9. I provide a pair of hydraulic cylinders E—E that have their lower ends pivoted at 10 to brackets 11 that are attached to the frame A. The hydraulic cylinders E—E each has a piston, not shown, and a piston rod 12 extending therefrom, the outer end of the piston rod being pivotally connected at 13 to a channel 14 that in turn forms a part of the frame that supports the rectangular table top 3. It should be noted from FIGS. 8 and 9, that the distance between the pivot point 4 and the end 3a of the table top D is greater than the vertical distance between the pivot point 4 and the floor 9. Therefore, when the table top D is swung upwardly into a position about 5° off from a vertical plane, the end 3a of a table top D will engage with the floor 9 and lift the front end of the frame A above the floor. This will lift the front caster wheels B—B off the floor and the frame A will be prevented from accidental movement.

It is now best to describe how the table top D is provided with rubber rollers for supporting a large glass sheet when the table top is in an upwardly inclined position and also how the table top platform 3 is provided with a plurality of spaced apart spherical balls for contacting the undersurface of the glass sheet for supporting the glass whether the table top is in an upwardly inclined position or in a horizontal position.

Figures 12, 13, 14, 15:
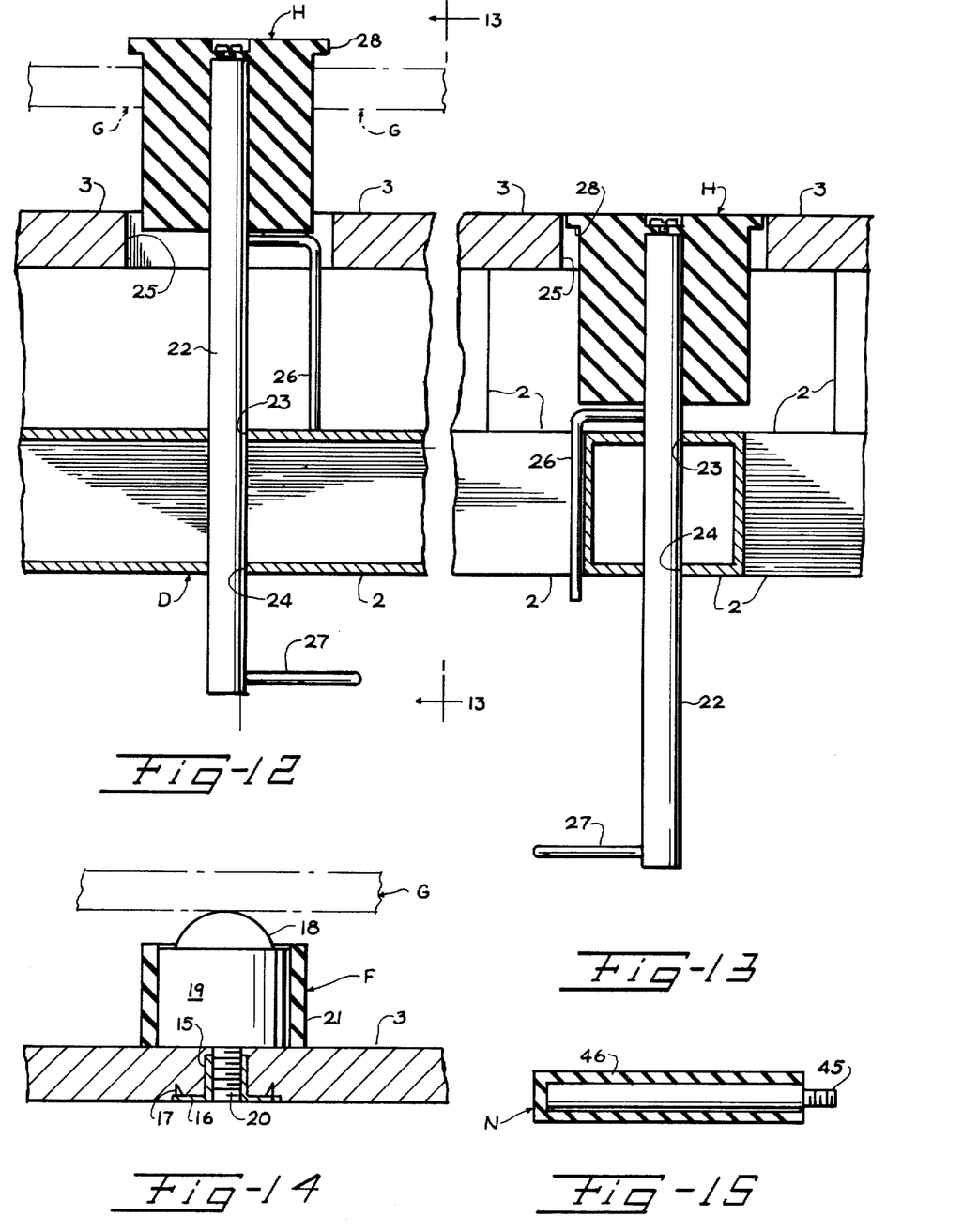
FIG. 12 is an enlarged longitudinal section taken along the line 12—12 of FIG. 8 and illustrates one of the sheet glass supporting rubber rollers in operative position.
FIG. 13 is a section taken along the line 13—13 of FIG. 12 and illustrates the glass supporting rubber roller in inoperative position. The L-shaped pin that engages with a frame member in FIG. 12 for supporting the rubber roller in operative position has been swung through an arc of 90° so as not to engage with the frame and the weight of the roller will move it into an inoperative position where the end of the roller will lie flush with the upper surface of the table top.
FIG. 14 is an enlarged transverse section taken along the line 14—14 of FIG. 8 and illustrates one of the spherical ball mounts for supporting the glass sheet a spaced distance above the table top.
FIG. 15 is an enlarge view, partly in section, of one of the glass supporting pins shown in FIGS. 5 and 6 for supporting one of the glass sheets after the large sheet glass has been severed into two pieces.
Figure 16:
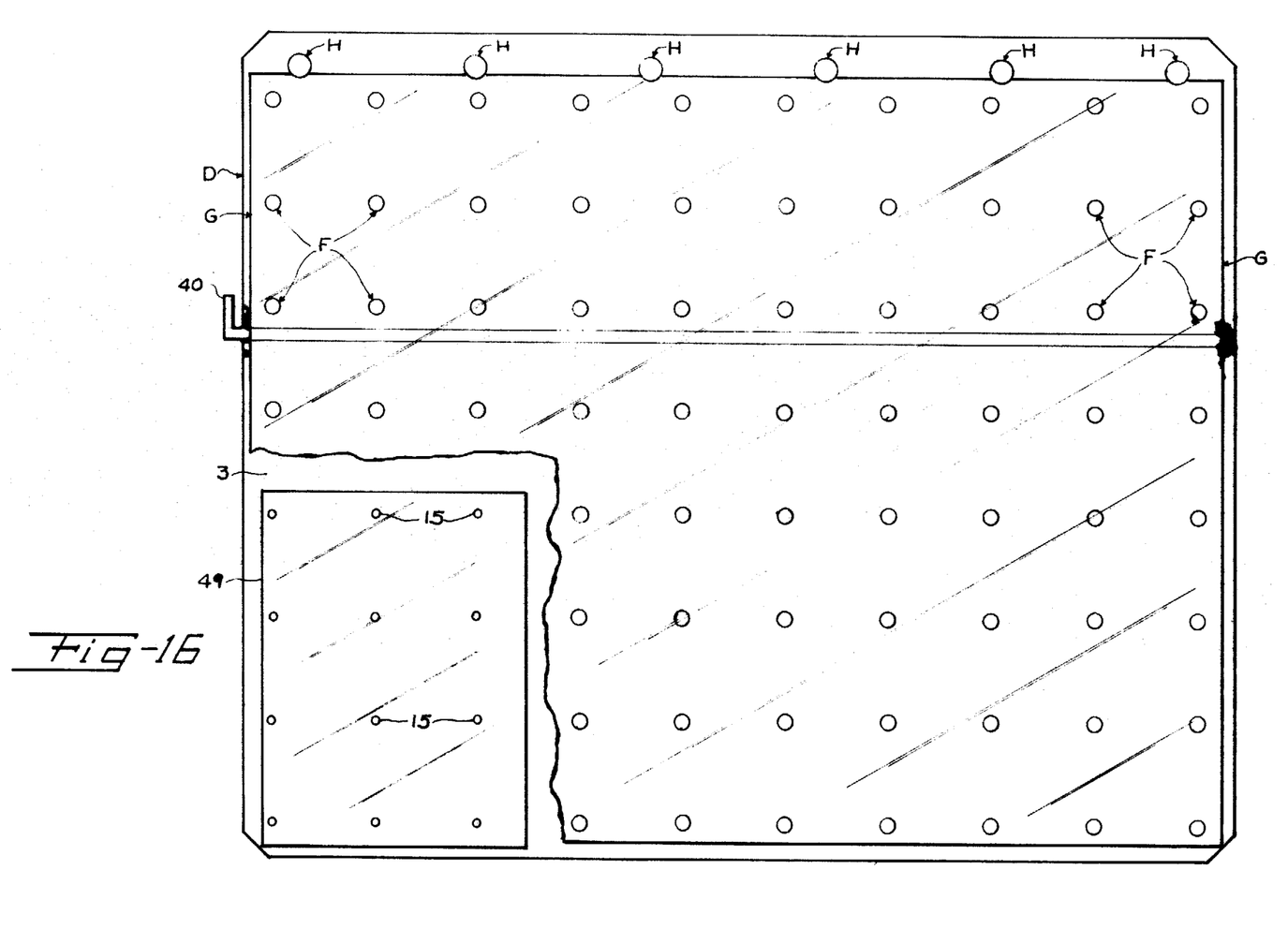
FIG. 16 is a plan view of the table top showing the spherical balls supporting a large sheet of glass. A portion of FIG. 16 shows a few of the spherical balls removed and a smaller piece of glass resting directly on the horizontal table top preparatory for the glazzier doing further cutting on this smaller piece.

In FIG. 16, I show a top plan view of the rectangular table top platform 3 and it is provided with a plurality of spaced apart spherical balls indicated generally at F. These balls are shown supporting a large sheet of clear flat glass G and in FIGS. 7 and 8, a side elevation of the balls is illustrated, while in FIG. 14 an enlarged detail is shown with parts broken away for clarity. Referring specifically to FIG. 14, I show an internally threaded sleeve 15 that has an annular flange 16 with prongs 17 adapted to be embedded in the underface of the table top platform 3. The platform 3 has an opening for receiving the sleeve 15. A ball 18 is mounted in a cup 19 for free rotation therein in any direction. The cup retains the ball against accidental displacement and the cup has an integral threaded shank 20 adapted to be removably mounted in the threaded sleeve 15. A rubber sleeve 21 encloses the outer cylindrical surface of the cup 19. A sufficient number of the spherical balls F are provided over the table top platform 3 for supporting the large glass sheet G at a spaced distance above the table top.

Figure 1:
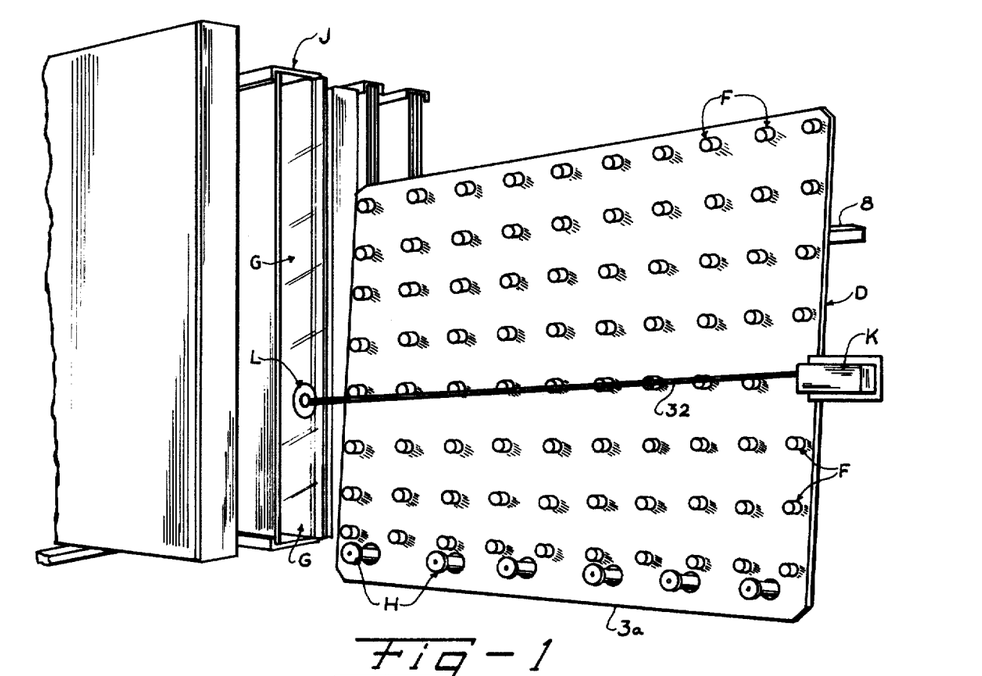
FIG. 1 shows the table top raised and the device positioned near the open end of a casing containing large sheets of glass or other material. An electric winch is illustrated as being in operative position at one end of the table top and a cable extends from the winch and has a vacuum cup connected at the free end of the cable, the vacuum cup being attached to the exposed side of a large glass sheet.

A plurality of rubber rollers H are provided near the edge 3a of the table top D, see FIGS. 1 and 9, and these rollers are movable from operative position, shown in FIG. 12, into inoperative position, as shown in FIG. 13. The rollers H support the lower edge of the glass sheet G when the rollers are in operative position and the table top is in an upwardly inclined position. One of the box beams 2 of the frame that supports the rectangular table top platform 3 is a part of the frame and is shown in enlarged sectional detail in FIGS. 12 and 13. The rubber roller H is rotatably mounted on a shaft 22 that extends through aligned openings 23 and 24 in one of the box beams 2. The rectangular table top platform 3 has an opening 25 for each rubber roller H so that the roller can be moved back into an inoperative position, as shown in FIG. 13, the opening 25 receiving the roller.

Again referring to FIGS. 12 and 13, it will be seen that the shaft 22 for the rubber roller H has an inverted L-shaped pin 26 positioned directly under the roller and the shaft is also provided with a radially extending handle 27 at its lower end. The handle 27 preferably lies in the same plane as the plane of the inverted L-shaped pin 26. In FIG. 12, the rubber roller H is shown in operative position and the operator has rotated the shaft 22 by means of the handle 27 so as to place the lower end of the L-shaped pin to rest on top of the box beam 2. The rubber roller H will now project through the opening 25 in the table top platform 3, and it can support the lower edge of the sheet glass G in a manner hereinafter described. The rubber roller has an annular flange 28 at its outer end for preventing the sheet glass from accidentally slipping off from the roller. FIG. 13 shows the rubber roller retracted so that the outer end of the roller will lie flush with the surface of the table top platform 3. The operator in moving the rubber roller into an inoperative position grasps the handle 27 and rotates the shaft 22 on its axis until the lower end of the inverted L-shaped pin 26 rides clear of the box beam 2, as is clearly shown in FIG. 13. The weight of the rubber roller H and its shaft 22 will now be sufficient to move the roller and shaft into the inoperative position as illustrated.

Figure 2:
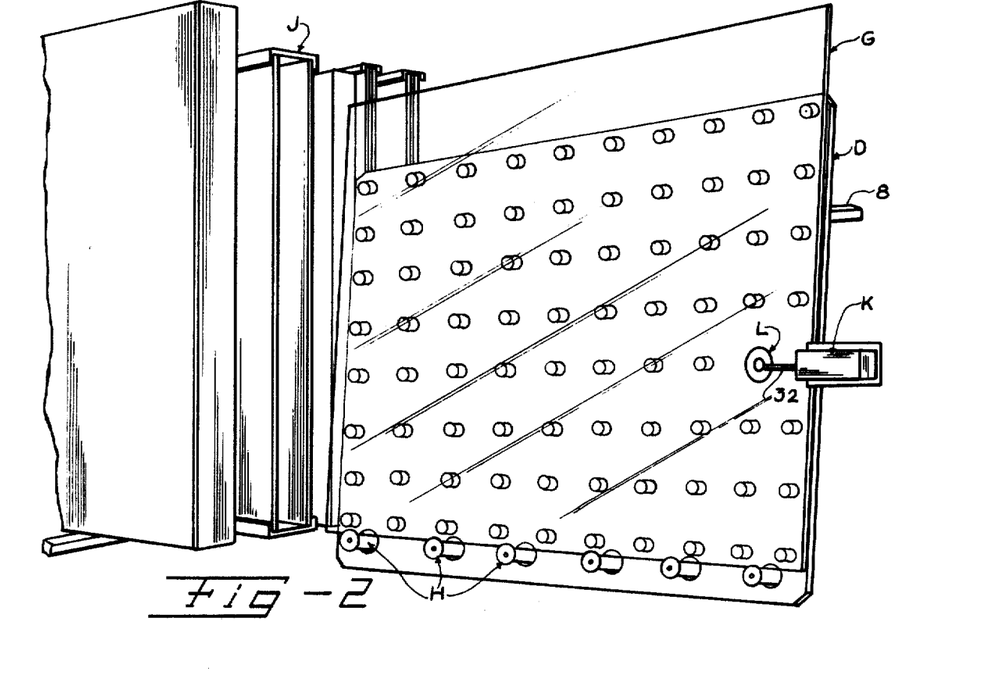
FIG. 2 is a view similar to FIG. 1, excepting that the glass sheet has been moved entirely free of the casing and is supported by the extended rubber rollers. The vacuum cup has been moved to a higher position and reattached to the glass for causing the cable to pull the glass more on the same level with the winch.

I will now describe the means for pulling a large sheet of glass G or other material from an open ended casing J, shown in FIG. 1. An electric winch, indicated generally at K in FIGS. 1, 2, 7 and 8, is mounted at the edge of the table top D that is fartherest removed from the open ended casing J. In FIG. 7, I show how the winch can be swung from operative position into inoperative position and vice versa. The winch is mounted substantially midway between the top and bottom edges of the tiltable table top D when it is in an upright position, as shown in FIGS. 1 and 2, so that the operator can stand by the winch for operating it. The electric winch K is mounted on a base 29 that in turn is pivotally connected at 30 to the table top D so that the winch can be swung from an operative position, shown by the full lines in FIG. 7, into an inoperative position where the winch will be disposed under the table top, as indicated by the dot-dash lines in the same Figure. The electric winch is secured in operative position by any means, not shown, and is secured in inoperative position by a locking pin 31, shown in FIG. 7.

Referring again to FIG. 1, I show the electric winch K in operative position and a cable 32 extends from a drum, not shown, in the winch to a vacuum cup L which is attached to the adjacent end of a glass sheet G. The operator has previously moved the portable frame A to a position adjacent to the open end of the casing J and has activated the hydraulic mechanism, not shown, for delivering fluid under pressure into the hydraulic cylinders E—E for extending the piston rods 12—12 for swinging the table top D into an upwardly inclined position with the lower edge of the table top contacting the floor 9 and raising the front end of the frame A above the floor and thereby preventing any accidental movement of the device. The operator has also moved the rubber rollers H into operative position and now stands by the winch and closes an electric switch, not shown, for causing the drum in the winch to start pulling on the cable 32 and the vacuum cup L for moving the large glass sheet G onto the rubber rollers H. The table top D is inclined about 5° from a vertical plane and this will cause the glass sheet G to lean against the balls F rather than against the table top platform 3 as the glass is slowly moved.

FIG. 2 shows the sheet glass G entirely moved onto the table top D and freed from the casing J. During the movement of the glass sheet onto the rubber rollers H, the operator may momentarily stop the winch K and reattach the vacuum cup L at a higher point on the glass G, as shown in FIG. 2, so that the cable 32 will pull more in a horizontal plane than at the angle shown in FIG. 1.

Figure 3:
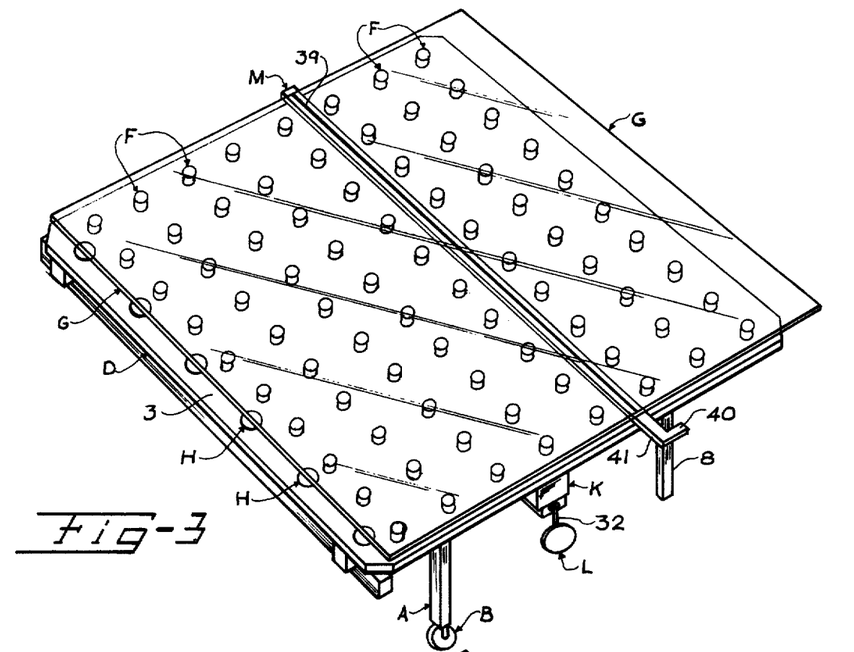
FIG. 3 shows the table top swung down to a horizontal position and the sheet glass supported by a plurality of spaced apart spherical balls that hold the sheet glass above the upper surface of the table top. The rubber rollers that formerly supported the glass have been moved into the inoperative position. A glass breaker bar rests on the table top and underlies the glass sheet and has one edge paralleling a line of cut made by a glass cutter. This Figure also shows table legs, which are a part of the table top, resting on the floor which prevents the table from moving while cutting the glass. By raising the table top for the legs to clear the floor allows the table to be moved.

In FIGS. 3 and 7, the table top D is shown back in a horizontal position with the glass sheet E now being supported by the balls F. The rubber rollers H have not been retracted into inoperative position in FIGS. 7 and 8, but in FIG. 3 they are shown in retracted position with the tops of the rollers lying flush with the upper surface of the table top platform 3. The balls F permit the operator to move the glass sheet over the table top D into any desired position.

The operator may now cut the glass sheet G along a line that extends in any desired direction. FIG. 3 shows a line of cut 39. The electric winch K is moved into an inoperative position underlying the table top D when the table top assumes a horizontal position, see also the dot-dash line position of the winch K in FIG. 7. I provide a breaker bar M, see FIG. 3, that has a length greater than the length of the glass sheet G and has a thickness less than the space between the glass sheet and the adjacent surface of the rectangular platform 3. The width of the breaker bar M is greater than the space between the glass sheet and the platform 3.

Figure 4:
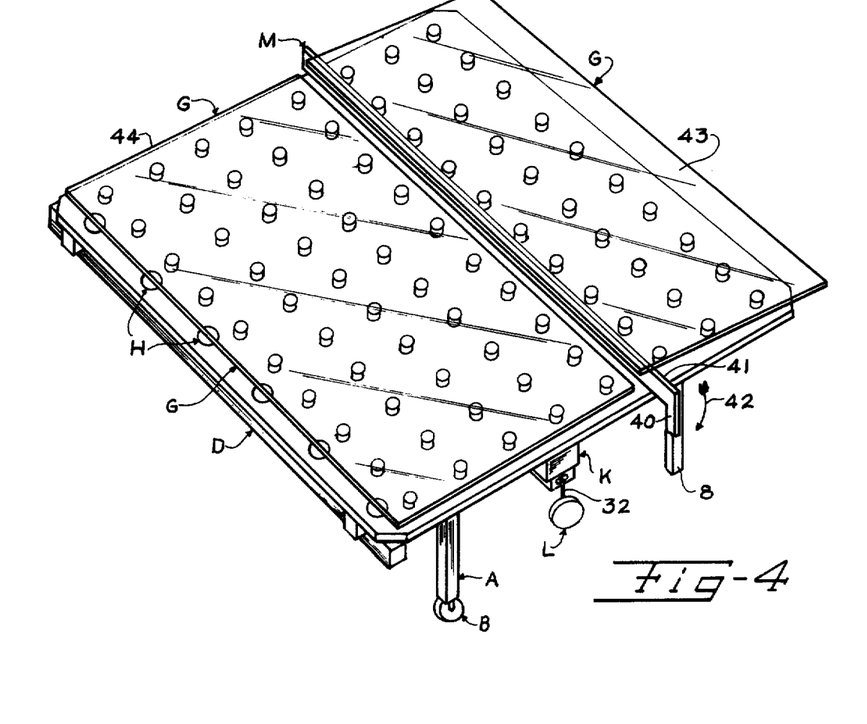
FIG. 4 is similar to FIG. 3 and shows the breaker bar after being rotated on its longitudinal axis through an arc of 90° for swinging the wider side of the bar into a vertical position with the plane of the table top, the greater bar width being more than the vertical distance between the undersurface of the sheet glass and the upper surface of the table top, whereby the bar will lift one portion of the glass adjacent to the line of cut and will sever the sheet into two pieces at the line of cut.

The breaker bar M has a handle 40 at one end, see FIGS. 3 and 4. After the operator makes his line of cut 39, he slips the breaker bar M between the glass sheet G and the table top D, care being taken that the handle 40 of the breaker bar parallels the plane of the glass. Since the thickness of the breaker bar is less than the vertical space between the glass sheet G and the table top, the operator will have no difficulty in moving the bar under the glass and aligning the edge 41 of the bar parallel with the line of cut 39 on the glass so that the width of the bar will lie to the right of the cut in FIG. 3.

The operator now swings the handle 40 of the breaker bar M downwardly in the direction of the arcuate arrow 42, shown in FIG. 4. This movement will swing the width of the bar M from the horizontal position, shown in FIG. 3, into the vertical position, shown in FIG. 4, and since the bar width is greater than the vertical space between the sheet glass G and the table top D, the edge 41 of the bar will lift the section 43 of glass that is disposed to the right of the cut line 39, so as to break the glass along the line 39, as clearly shown in FIG. 4. The glass sheet G is now severed into two pieces 43 and 44. The operator then rotates the breaker bar M through another 90° of rotation, which causes the two pieces of glass to separate and allows the removal of the bar.

Figure 5:
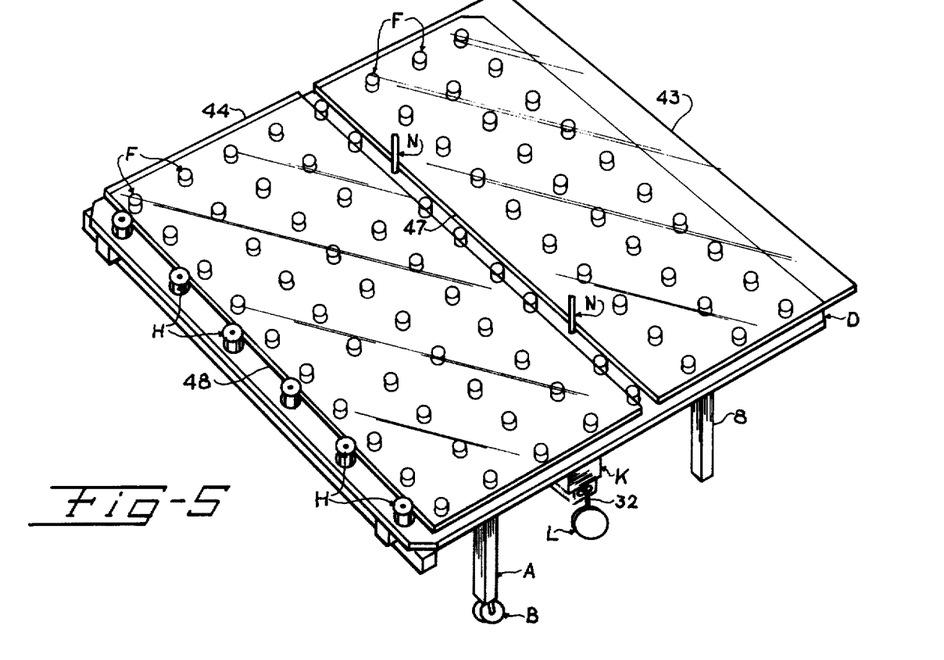
FIG. 5 shows the table top still in a horizontal position with the two glass pieces spaced apart and the rubber rollers moved back into operative position preparatory to supporting the adjacent glass sheet when the table top is again raised. Also, the other glass piece bears against two sheet glass supporting pins that have been inserted into the table top.

I now refer to FIG. 5, where I show the sheet glass piece 43 spaced away from the glass piece 44, while the table top D is still in a horizontal position. In FIG. 15, I illustrate a sheet glass supporting pin N that has an integral threaded shank 45 at one end. The pin N may be encased in a rubber sleeve 46, if desired. I have already described how the threaded shank 20 for the cup 19, see FIG. 14, is removably received in the threaded sleeve 15. The operator can remove the glass piece 44 from the table top D by first removing two of the ball supports F from their threaded sleeves 15 and inserting the threaded shanks 45 of two of the glass supporting pins N into the threaded sleeves, as shown in FIG. 5. The glass piece 43 will now have its edge 47 contact the two pins N.

Figure 6:
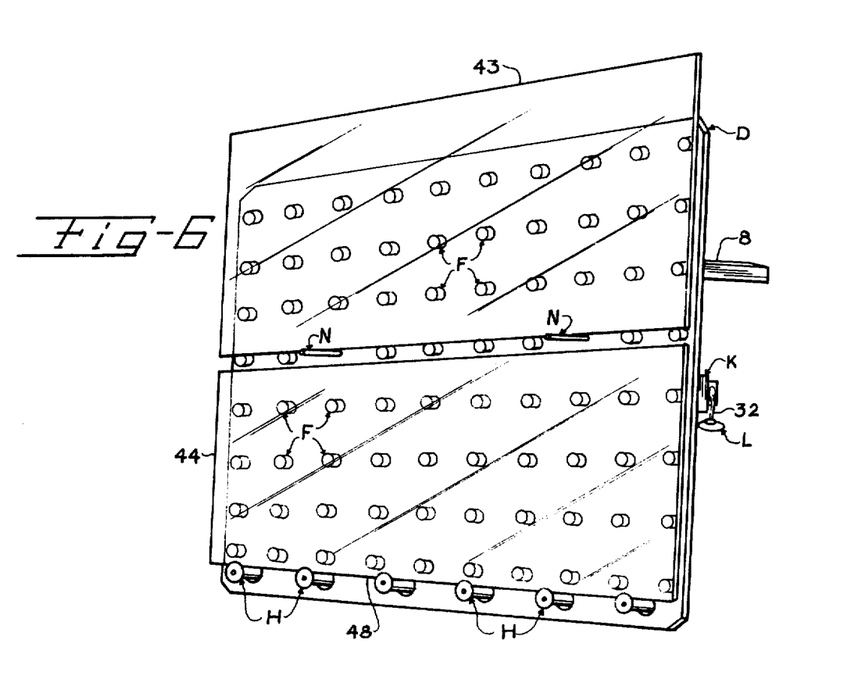
FIG. 6 illustrates the table top in raised position with the lower sheet glass resting on the rubber rollers and the upper sheet glass resting on the glass supporting pins.

The operator also moves the rubber rollers H, in FIG. 5, back into operative position so that the edge 48 of the glass piece 44 will contact these rollers. Next, the table top is swung into an upwardly inclined position, as shown in FIG. 6, where the upper glass piece 43 will be supported by the pins N—N and the lower glass piece 44 will be supported by the rubber rollers H. The glass pieces 43 and 44 will not fall off from the upwardly tilted table top D because the table top is inclined about 5° from a vertical plane.

In a copending patent application on a dolly for lifting and transporting and installing large sheets of glass and other flat sheet products, Ser. No. 169,415, filed Aug. 5, 1971, I disclose a device that can be operated by one person and which enables the operator to remove the lower piece of glass 44 from the upwardly inclined table top D, see FIG. 6. After this is done, the table top is swung into a horizontal position and the pins N—N are moved. The glass sheet 43 can now be moved by the operator over the sheet glass supporting balls F, into any desired position relative to the table top for further cutting. Or, if the operator wishes to remove the glass piece 43 from the table top D, he can move the glass until its edge 47 contacts the rubber rollers H. Then the operator again tilts the table top into an upwardly inclined position and he can use the device shown in my copending application Ser. No. 169,415, for removing the glass sheet from the table top.

In FIG. 16, I show a plan view of the table top D with its plurality of sheet glass supporting balls F, supporting a large glass sheet G in a horizontal plane. I further show the large sheet of glass broken away in order to illustrate how it is possible to handle a smaller piece of glass 49 and have this rest directly on the table top platform 3, rather than on the balls F. FIG. 14 shows how each sheet glass supporting ball F can be removed from its threaded sleeve 15, and FIG. 16 shows a number of these balls F removed so that the smaller glass sheet 49 can rest directly on the table top. The operator can cut the glass sheet 49 in any manner he desires.

I claim:

1. A portable table top for receiving flat sheet material, comprising:
    a. a portable frame;
    b. a table top pivotally carried by said frame;
    c. means for swinging said table top from a horizontal position into an upwardly slightly inclined position from a vertical plane;
    d. a row of flat sheet supporting rollers arranged near the lower edge of said table top when the latter is in a raised position;
    e. a winch mounted at one side of said table top and having a cable with a vacuum cup attached to the free end of said cable and being attachable to a flat sheet of material for moving the sheet edgewise in the direction of its plane when said winch is operated;
    f. whereby the cable from said winch can be stretched across the front of the upwardly inclined table top and the vacuum cup attached to a flat sheet of material and then the winch can be operated for causing the cable and vacuum cup to pull the flat sheet edgewise onto the table top, the lower edge of the flat sheet riding on the rollers;
    g. a plurality of rotatable balls removably mounted on the table top and are spaced the same distance from the table top surface so as to support the flat sheet material a predetermined distance from the table top surface;
    h. each ball being rotatably mounted in a cup that has a threaded shank removably received in a threaded bore provided in the table top, the cup being enclosed in a rubber sleeve.

2. A portable table top for receiving flat sheet material, comprising:
    a. a portable frame;
    b. a table top pivotally carried by said frame;
    c. means for swinging said table top from a horizontal position into an upwardly slightly inclined position from a vertical plane;
    d. a row of flat sheet supporting rollers arranged near the lower edge of said table top when the latter is in a raised position;
    e. a winch mounted at one side of said table top and having a cable with a vacuum cup attached to the free end of said cable and being attachable to a flat sheet of material for moving the sheet edgewise in the direction of its plane when said winch is operated;
    f. whereby the cable from said winch can be stretched across the front of the upwardly inclined table top and the vacuum cup attached to a flat sheet of material and then the winch can be operated for causing the cable and vacuum cup to pull the flat sheet edgewise onto the table top, the lower edge of the flat sheet riding on the rollers;
    g. means provided for moving the rollers into inoperative position so that their outer ends will lie substantially flush with the surface of the table top when the latter is returned to a horizontal position;
    h. the means for moving said rollers into inoperative position comprises:
    i. a shaft for rotatably supporting each roller;
    j. an elongated frame member slidably supporting each shaft; and
    k. an inverted L-shaped pin having a first arm secured to said shaft and extending radially therefrom, the second arm of said pin paralleling the shaft axis and extending away from said roller that is carried by said shaft;
    l. whereby a radially extending handle on said shaft and lying in the same plane as said first arm can be swung for rotating said shaft and L-shaped pin through an angle of 90° for swinging said second arm free of said elongated frame member and permitting said second arm to move along the side of said frame member as the shaft and roller move into an inoperative position.

3. A portable table top for receiving flat sheet material, comprising:
    a. a portable frame;
    b. a table top pivotally carried by said frame;
    c. means for swinging said table top from a horizontal position into an upwardly slightly inclined position from a vertical plane;
    d. a row of flat sheet supporting rollers arranged near the lower edge of said table top when the latter is in a raised position;
    e. a winch mounted at one side of said table top and having a cable with a vacuum top attached to the free end of said cable and being attachable to a flat sheet of material for moving the sheet edgewise in the direction of its plane when said winch is operated;
    f. whereby the cable from said winch can be stretched across the front of the upwardly inclined table top and the vacuum cup attached to a flat sheet of material and then the winch can be operated for causing the cable and vacuum cup to pull the flat sheet edgewise onto the table top, the lower edge of the flat sheet riding on the rollers;

g. said portable frame having a front portion with a pair of caster wheels supporting the front portion and a rear portion with a rear caster wheel supporting the rear portion;

h. said table top having a rear portion with at least one leg adapted to contact the floor when the table top is in a horizontal position;

i. whereby the leg when contacting the floor will prevent the accidental movement of said portable frame over the floor, said table top swinging means being adapted to swing said table top about its pivot to lift said leg to just clear the floor whereupon said portable frame can be moved over the floor.

4. A portable table for receiving flat sheet glass and comprising:

a. a portable frame;

b. a table top pivotally carried by said frame;

c. means for swinging said table top from a horizontal position into an upwardly slightly inclined position from a vertical plane;

d. a row of flat sheet supporting rollers arranged near the lower edge of said table top when the latter is in a raised position;

e. said portable frame having a front portion supported by caster wheels and a rear portion with at least one rear caster wheel supporting it;

f. said table top having a rear portion with at least one leg adapted to contact the floor when the table top is in a horizontal position;

g. whereby said leg when contacting the floor preventing the accidental movement of said portable frame over the floor, said table top swinging means being adapted to swing said table top about its pivot to lift said leg to just clear the floor whereupon said portable frame can be moved over the floor.

5. A portable table for receiving flat sheet glass and comprising:

a. a portable frame having a front portion supported by casters;

b. a table top pivotally carried by said frame, the pivot point for the table top being at a predetermined distance above the floor and at the front portion of said frame, said table top when in a horizontal position having a front portion projecting beyond the front of said portable frame a distance greater than the vertical distance between the pivot point for said table top and the floor; and c. means for swinging said table top from a horizontal position into an upwardly slightly inclined position from a vertical plane, said front portion of said table top being swung downwardly into contact with the floor and raising the front portion of said frame above the floor to prevent any accidental movement of the frame over the floor;

d. the front portion of said portable frame having a pair of caster wheels supporting it and the rear portion of said frame having a caster wheel supporting it;

e. said table top having a rear portion with at least one leg adapted to contact the floor when the table top is in a horizontal position;

f. whereby the leg when contacting the floor will prevent the accidental movement of said portable frame over the floor, said table top swinging means being adapted to swing said table top about its pivot to lift said leg to just clear the floor whereupon said portable frame can be moved over the floor.

* * * * *